United States Patent [19]

Goldschmidt et al.

[11] 4,074,319
[45] Feb. 14, 1978

[54] LIGHT EMITTING DIODE ARRAY IMAGING SYSTEM - PARALLEL APPROACH

[75] Inventors: Wilbur Harry Goldschmidt, Sparta; Hansjuergen Hermann Henning, Summit; William John Kapes, Jr., Randolph Township, Morris County, all of N.J.

[73] Assignee: Bell Telephone Laboratories, Incorporated, Murray Hill, N.J.

[21] Appl. No.: 750,273

[22] Filed: Dec. 13, 1976

[51] Int. Cl.² .............................................. H04N 5/66
[52] U.S. Cl. .................................. 358/230; 358/240; 358/241
[58] Field of Search ........................ 358/230, 240, 241

[56] References Cited

U.S. PATENT DOCUMENTS

| | | | |
|---|---|---|---|
| 3,590,156 | 6/1971 | Easton | 358/240 |
| 3,627,924 | 12/1971 | Fleming et al. | 358/241 |

*Primary Examiner*—Richard Murray
*Attorney, Agent, or Firm*—Henry T. Brendzel

[57] ABSTRACT

Disclosed are a method and apparatus for developing a pictorial field display from transmitted facsimile data. The display, which comprises an array of two level ("on"/"off") energy sources such as light emitting diodes, achieves multitone operation by digitally controlling the time duration during which the energy sources are activated. Received data is stored in a multiport memory connected to the energy sources, permitting the simultaneous activation of the energy sources in the array.

25 Claims, 7 Drawing Figures

LIGHT EMITTING DIODE ARRAY IMAGING SYSTEM - PARALLEL APPROACH

BACKGROUND OF THE INVENTION

1. Field of the Invention

This invention relates to facsimile systems. More particularly, this invention relates to imaging arrays having a plurality of energy sources and means for accessing and activating the energy sources.

2. Description of the Prior Art

In a conventional facsimile transceiver, transmission of data is performed by scanning a data-containing document line by line and by converting the light reflected from the scanned portions of the document into a series of corresponding electrical signals. Those signals are transmitted, typically over a conventional telephone line, to a remote facsimile transceiver where the signals are processed to reproduce the information on a suitable print medium.

In the transmitter portion of a conventional transceiver, a light beam, generally produced by a cathode ray tube, is caused to scan along one axis across the document while the document is incrementally moved along an axis perpendicular to the direction of scanning. In that manner, the entire document is effectively traversed with parallel scans.

In the receiver portion of a transceiver, several electronic and mechanical techniques are in common use for the purpose of processing received data to produce an image on a print medium. One such technique employs a mechanical stylus operating in response to the received data signals to print the desired pattern on specially prepared paper. Another technique employs a print paper which contains overlaying black and white layers. Portions of the white layer are selectively burned or etched away by the use of an electrically charged stylus that operates in accordance with the received data signals, thereby developing the desired pattern.

Still other known facsimile receivers employ a light source, such as a cathode ray tube. The light beam is modulated in accordance with the received data signals and is scanned over a suitably treated medium to form a pattern of locations on the paper. The medium may be photographic film which is subsequently processed to produce a permanent image. U.S. Pat. No. 3,924,061 issued to Tregay el al on Dec. 2, 1975, and U.S. Pat. No. 3,869,569 issued to Mason et al on Mar. 4, 1975, are examples of such facsimile receivers.

In yet other receivers, the light source employed is a laser beam. Such receivers operate in a manner similar to those employing a cathode ray tube but the beam is generally applied to a print medium other than photographic film. In "Experimental Page Facsimile System," by H. A. Watson, *Bell Laboratories Record*, March 1975, page 153, a laser receiver is described where the print medium is bismuth film.

A common thread to the above described techniques is the use of a single light source to form a two dimensional received image and the use of analog modulation of the light source intensity to control the gray levels of the resultant pattern.

In a slightly different field of art, a two-dimensional display is achieved by the use of a plurality of light sources arranged in a matrix configuration. Of common knowledge are gaseous displays and light emitting diode (LED) arrays which are used extensively to display alphanumerics. For example, LED arrays having groups of diodes preselectively interconnected and activated as a group (e.g., seven segments) are commonly used in calculator displays. A slightly different LED array arrangement is disclosed in U.S. Pat. No. 3,800,177 issued to Russ on May 26, 1974, where the LED array is arranged in a horizontal and vertical address matrix and where the activation of a particular horizontal and vertical address line pair activates a single LED. Whatever the application, LED arrays have heretofore been used only to display a two-tone image (generally red on a black background).

Different arrangements, such as described in U.S. Pat. No. 3,863,023 issued to Schmersal et al on Jan. 28, 1975, provide multitone displays. In the arrangement described by Schmersal, multitone operation (graduated intensity levels of a particular tone such as green, red, black, etc.) is achieved in a gaseous discharge panel having a multiple number of memory planes. In particular, a number of gray level ranges are defined and an equal number of memory planes are employed, with each memory plane having the same number of storage areas as the number of storage and discharge areas in the display panel. (For simplicity, the term "gray level" is employed in this disclosure regardless of the actual hue employed). In generating the data base, a pictorial field is scanned and the elements of the signal corresponding to the picture elements are digitized according to the gray level range in which they fall. In forming a replica of the image field, the signals representing the digitized picture elements are fed in sequence to the various memory planes corresponding to each gray level. The brightness level of each plane is controlled by the storage characteristics of each memory plane and the duration of excitation.

The Schmersal et al apparatus is cumbersome because it requires the use of hardware that is both bulky and expensive. Additionally, the memory planes of Schmersal must be accurately aligned and separately driven with high voltages.

Another method for effecting different gray levels is described in U.S. Pat. No. 3,604,846 issued to Behane et al on Sept. 14, 1971. In accordance with the teachings of Behane et al, gray level graduations can be achieved by subdividing the area of each picture element (pel) into a plurality of subareas, e.g., a 3 × 3 matrix having nine subareas, and by marking black a number of the subareas in accordance with the gray level desired. Thus, white pels are obtained by marking black none of the subareas, progressively darker gray pels are obtained by marking black greater numbers of subareas, and black pels are obtained by marking black all nine subareas.

The Behane method is useful in situations where high receiver resolution is inherent in the system and is, therefore, obtained at low cost. Where high resolution is not inexpensively available, this method becomes too costly because for each macroscopic resolution element (pel), a large plurality of microscopic resolution elements (the subareas) must be employed.

It is an object of this invention, therefore, to provide a two-dimensional multitone facsimile system that is small, effective and inexpensive.

It is another object of this invention to provide a facsimile system employing a plurality of energy sources, e.g., light sources, to form the display image.

It is still another object of this invention to provide a facsimile system responsive to digitally encoded data signals.

SUMMARY OF THE INVENTION

These and other objectives are achieved with the disclosed method and apparatus for developing a pictorial field display from transmitted facsimile data. The display, which comprises an array of two level energy sources, such as light emitting diodes, achieves multitone operation by digitally controlling the time duration during which the energy sources are activated. Received data is stored in a multiport memory connected to the energy sources, permitting the simultaneous illumination of the energy sources in the array.

Although the energy sources contemplated may be any energy sources (such as X-ray sources), throughout the remainder of this disclosure reference shall be made only to light sources and, in particular, only to light emitting diodes (LEDs).

DETAILED DESCRIPTION

The pictorial information destined for transmission by a facsimile transmitter is obtained by sampling and coding the scanned information. The sampling process effectively divides each line scan into a plurality of picture elements (pels), and the coding process formats the pel data into binary coded words representing the gray levels of the pels. The coded words are transmitted sequentially, with the least significant bit (LSB) first. Binary coded words, in the context of this invention, are multibit fields where the value of each bit, $A_n$, is $2^{n-1}$, where $n$ is the position of the bit within the field.

Figure 1:
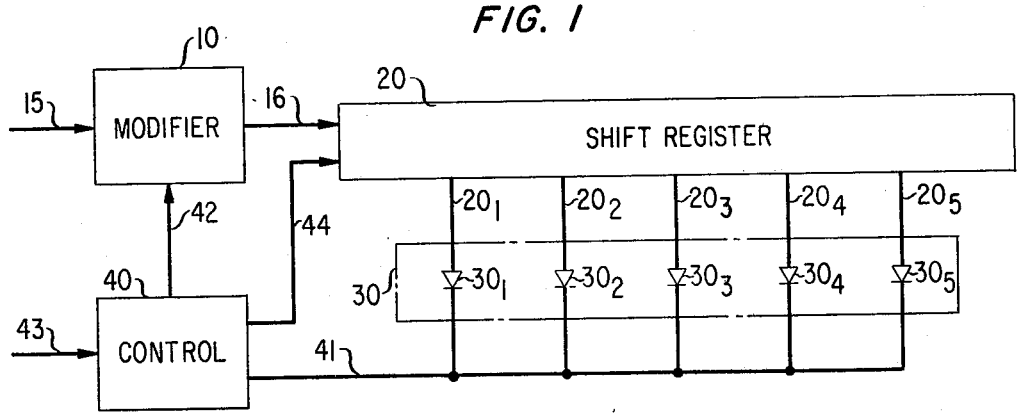
FIG. 1 illustrates a general schematic diagram of a facsimile receiver embodying the principles of this invention.

FIG. 1 depicts a schematic diagram of a facsimile receiver embodying the principles of this invention. In FIG. 1, received data is applied to memory 20 through modifying element 10. Memory 20, which is shown in FIG. 1 as a shift register, is a memory having a plurality of output ports $20_1$, $20_2$, $20_3$, ... $20_i$, arranged at regular storage intervals. The number of ports and the storage interval between ports are selected by the user. In the embodiment disclosed herein, it is advantageous for the storage interval between adjacent ports to be at least equal to the size of the data words (number of bits) applied to memory 20. For purposes of this disclosure, therefore, words entering memory 20 are chosen to have 7 bits each and the parallel outputs of register 20 are selected to occur every 7 bits. Thus selected, corresponding bits of each of the words stored in shift register 20 appear at their respective output ports simultaneously.

Corresponding to each output port $20_i$, there is a light emitting diode (LED) $30_i$ having a preselected one of its terminals connected to its respective memory output port. The diode terminals not connected to memory output ports are connected to line 41 extending from control element 40. Diodes $30_1$, $30_2$, $30_3$, ... $30_i$ are arranged in a diode array 30. In accordance with the principles of this invention, diode array 30 is enabled by applying an appropriate voltage on line 41, causing each and every diode in array 30 to be enabled simultaneously. With the depicted polarity of diodes $30_i$, the enabling voltage on line 41 is a low voltage (logic level "0") which permits current to flow from memory 20, through diodes $30_i$, and into control element 40. The output signal of memory 20 is controlled with line 44, which provides a shifting clock to register 20 from control element 40.

Also in accordance with the principles of this invention, control of the gray level developed by each diode $30_i$ is obtained through lines 44 and 41, in combination with modifier element 10, as described below.

GRAY LEVEL CONTROL

Figure 2:
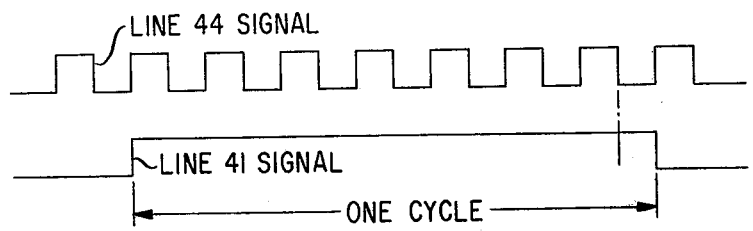
FIGS. 2 and 3 represent clock timing diagrams for different intensity control methods of the FIG. 1 receiver.

In accordance with one method for obtaining multitone operation, element 10 converts received binary coded words into a nonpositional binary format and stores the converted words in memory 20. A nonpositional format is one where each bit has an equal weight. For example, a three-bit binary coded input of decimal value $5_{(101)}$ is converted to a 7 bit field having five "1s" interspersed therein, e.g., 0011111. Corresponding to this conversion method, control element 40 is arranged to provide to line 44 seven data-display clock pulses of equal period, for shifting the 7 bit field through shift register 20. Concurrently, control element 40 provides an enable pulse to line 41 to enable the diodes in array 30 for the duration of the seven data-display clock periods. While enabled, each diode $30_i$ lights up a number of times equal only to the number of "1s" in the word stored and shifted out of the corresponding memory 20 port to which each diode $30_i$ is connected. The seven equal period data-display clock pulses of line 44 and the enabling pulse of line 41 are depicted in FIG. 2.

To achieve the above-described conversion process in element 10, a conventional combinatorial circuit is best employed. One such network comprises one three-bit register for storing the received binary coded signal words, seven gate arrangements connected to the three-bit register for encoding the signal words, and one seven-bit register for storing the encoded words. The Boolean equations of the seven gate arrangements are $A+B+C$, $A+\overline{B}$, $A+B\overline{C}$, $A$, $AC+AB$, $AB$, and $ABC$, where A, B and C are the outputs of the three-bit register, A is the MSB (most significant bit) and C is the LSB.

EXAMPLE

Given an input sequence of five words having the binary coded values 001, 011, 010, 000, and 110, element 10 converts the input sequence to the sequence 1000000, 1110000, 1100000, 0000000, and 1111110. The converted sequence is stored in memory 20 (with a data-load clock signal on line 44) with the least significant bits first which, in accordance with the spatial arrangement of FIG. 1, appears as follows:

| 1111110000000011000001110000100000 |
|---|
| ports    ↑$20_1$    ↑$20_2$    ↑$20_3$    ↑$20_4$    ↑$20_5$ |

During the first data-display clock pulse (on line 44) all output ports present a logic "0" output and therefore none of the LEDs in array 30 light up. During the second pulse, shift register 20 is advanced by one bit causing port $20_1$ to present a logic "1" output which, in turn, causes LED $30_1$ to light up. Advancing shift register 20 further, during the third and fourth clock pulses only LED $30_1$ lights up; during the fifth clock pulse LEDs $30_1$ and $30_4$ light up; during the sixth clock pulse LEDs $30_1$, $30_3$, and $30_4$ light up; and during the seventh clock pulse LEDs $30_1$, $30_3$, $30_4$ and $30_5$ light up.

During each data-display clock pulse that causes an LED to light up, a fixed quantum of light is generated. During each enable cycle, each LED produces a quantum of light equal to the magnitude of the received word which corresponds to that LED. Thus, in accordance with the principles of this invention, each LED in array 30 is capable of developing within each cycle any one of 7 gray levels; the dimmest being the LED which does not light up at all and the brightest being the LED which lights up at each and every data-display clock pulse of line 44.

Figure 3:
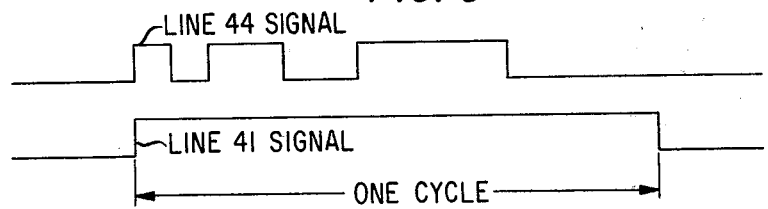

In accordance with another method for obtaining multitone operation, the binary coded format of the words received by element 10 is not changed. Because of the compactness inherent in positional encoding, memory 20 may be made smaller than in accordance with the method described above, or conversely, the same memory can accommodate a larger number of multitone variations. On the other hand, because of the positional nature of binary encoding, control element 40 can no longer deliver to line 44 clock pulses of equal duration during the enable cycle. Rather, the clock pulses produced by control element 40 and applied to line 44 must be related to the particular coding of the input data; and in the case of binary coding, must be related by a multiplicative factor of 2 to each other. That is, if the bits stored in memory 20 appear at the output ports with the LSB first followed by successively more significant bits, then the second clock pulse on line 44 must have twice the period of the first clock pulse, and each successive clock pulse must have twice the period of its preceding pulse. FIG. 3 depicts the three data-display clock pulses necessary to produce the 7 gray levels obtainable with the above described non-positional method.

One advantage of placing positionally coded data in memory 20 is the avoidance of a conversion in element 10. As expected, however, the illumination enabling pulse of line 41, as depicted in FIG. 3, is of duration equal to the duration of the illumination enabling pulse of FIG. 2. No time saving is realized through the use of positionally coded data because in order to obtain the certain quantum of light output, the LEDs must be illuminated for a particular period of time regardless by which method that illumination time is obtained.

EQUALIZATION

As indicated previously, element 10 modifies the format of data entered into memory 20 in order to implement the particular multitone method selected. Element 10 also serves the additional function of equalizing the LEDs in array 30.

Generally, the diodes in LED array 30 are constructed from different slabs of material. It is expected, therefore, that the LEDs in array 30 do not all produce the same quanta of light in response to the same stimuli. Also, the outputs of memory 20 do not necessarily provide exactly the same stimulus when required to do so. Such irregularities produce undesired variations in the light output of array 30 but, when not extreme, the variations are not noticeable in a two-dimensional array where each LED corresponds to a particular pel in the pictorial field. In fact, variations in light output of up to 2:1 have been experienced, and such variations are noticed even in two-dimensional arrays.

Many facsimile receivers, however, employ a linear (one dimensional) array rather than a two-dimensional array with a number of LEDs in the linear array equal to the number of pels in one scan. The pictorial field is developed in such receivers by moving a suitable print medium across the array as successive scans are illuminated. In such receivers, even very slight differences in LEDs light outputs are noticeable. These differences manifest themselves as longitudinal striations across the pictorial field, commonly referred to as artifacts.

Linear arrays are light sensitive in still another way. Two-dimensional LED arrays produce satisfactory multitone pictorial fields even with a low number of bits in the data words. Inasmuch as changes in gray level are expected from pel to pel and from scan to scan, no artifacts show up. Operating two-dimensional arrays with only few bits to define the gray levels is, therefore, quite feasible. With a linear array, on the other hand, the accuracy of each level must be tightly controlled to prevent artifacts even if the number of gray levels is relatively small. Therefore, the number of bits employed to effectively define each gray level in a LED facsimile system having a linear array is larger than the number of bits required to distinguish a desired number of gray levels. For example, with 15 gray levels (characterizable by five bits), it has been found that the use of seven bit words to accurately define each of the gray levels is recommended.

The correction, or equalization, for the output light variations in the LEDs of array 30 is performed in element 10. Since the total light output of each LED is simply a sum of a number of light pulses having fixed quanta of light, it has been found that the light response of each LED is linear with respect to the magnitude of the stimulus and that the light output error is a multiplicative error. Forearmed with this finding, modifier element 10 is adapted to multiply the magnitude of each received signal by a multiplicative correction factor. The correction factor for each signal relates to the error characteristic of the LED in array 30 which displays the multiplied signal. If the light output of LED $30_1$, for example, is 0.99 of normal and the light output of LED $30_4$ is 1.02 of normal, then signal words destined to LED $30_1$ are divided by 0.99 (or multiplied in element 10 by 1.01) while the signal words destined to lead $30_4$ are divided by 1.02 (or multiplied in element 10 by 0.96).

Figure 4:
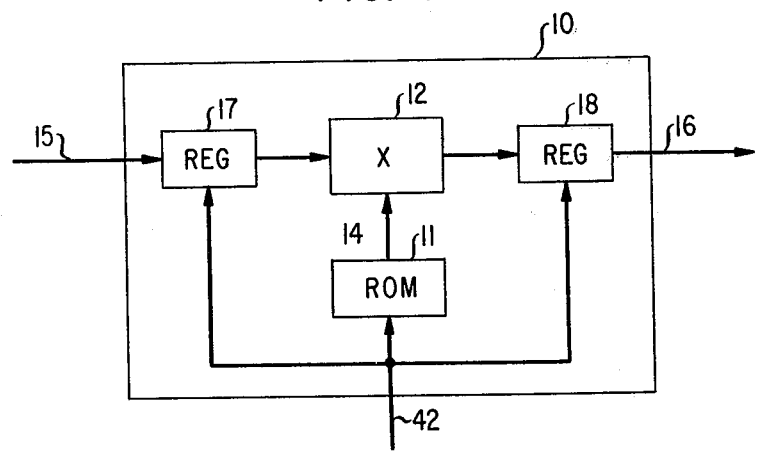
FIG. 4 depicts a block diagram of a signal modifier 10 suitable for use in the FIG. 1 receiver.

To implement the above described corrections, element 10 may employ a variety of techniques. As disclosed herein and shown in FIG. 4, element 10 comprises a ROM memory 11, a conventional multiplier 12, an input register 17 and an output register 18. Register 17 stores incoming words by latching the input under control of bus 42 while the latched words are applied to one input of multiplier 12. ROM 11 stores the multiplicative factors required for each LED and applies the factors (via bus 14) to the other input of multiplier 12, also under control of bus 42. Bus 42 signals emanate from control element 40.

Each multiplicative factor provided by ROM 11 is a binary word characterizing the multiplicative factor associated with the LED for which the currently applied received signal, appearing on lead 15, is destined. The received signals on lead 15 and the multiplicative factors on lead 14 are multiplied in multiplier 12. The product signals developed by multiplier 12 have a number of bits equal to the number of bits in the words appearing on lead 15 plus the number of bits in the words appearing on bus 14. Since that large number of bits is not necessary, the product signals of multiplier 12 are truncated to the number of bits suitable for memory 20 by storing only the desired bits in register 18. The truncated signals are applied to memory 20 directly (via lead 16) when binary encoded words are desired to be stored in memory 20. When words otherwise encoded are desired to be stored in memory 20, a code conversion block must be interposed between multiplier 12 and memory 20, as for example, the code conversion circuitry for nonpositional coding described infra.

The multiplicative correction factors stored in ROM 11 relate to the light output variations of the particular LEDs used in array 30. These factors are obtained by actually constructing array 30, by interfacing array 30 with memory 20, and by testing the light response of each LED within the array. Once obtained, the multiplicative factors are stored in ROM 11.

ILLUMINATION CONSIDERATIONS

Since the apparatus of FIG. 1 illuminates the LEDs of a full scan simultaneously, it appears that the actual illumination must occur during the time interval between scans, when the data in memory 20 is received and is stable. That is, all received signals for one scan must first be received, be multiplied in modifier element 10, and be stored in memory 20. Only then may array 30 be enabled. This is illustrated in the timing diagram of FIG. 5 where timing signal A is the pulse signal indicating the presence of a new received word; timing signal B is the data-load and data-display clock signal of line 44 which shifts information into and through shift register 20; and timing signal C is the array enabling signal of line 41. During interval X, memory 20 is loaded with corrected and truncated seven bit data words from element 10. During interval Y, array 30 is enabled to permit the LEDs to light up in accordance with the information in memory 20.

Figure 5:
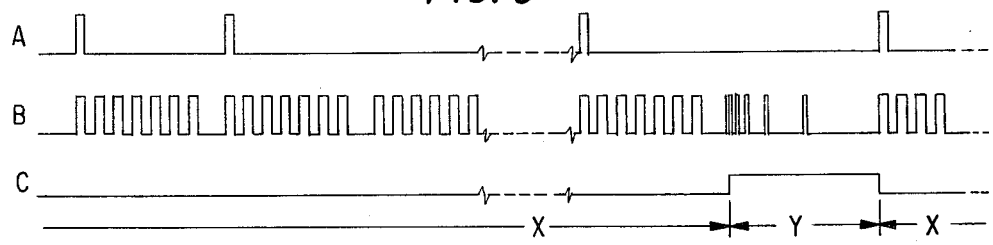
FIG. 5 describes a timing diagram of the data-load and data-display signals in the receiver of FIG. 1.

FIG. 5 clearly indicates that a major proportion of time is spent in shifting information into memory 20 rather than in illuminating a scan. This results directly from the elementary organization of the FIG. 1 receiver and from the need to best utilize the transmission bandwidth available to the facsimile data. When pel information is transmitted at a truly regular pel clock rate (corresponding to the pel sampling rate of the transmitter), then only one pel clock interval is available for illumination. If one pel clock interval is not sufficient for reliably generating the necessary quanta of light out of the LEDs of array 30, transmission efficiency can be sacrificed and a plurality of pel clock intervals may be dedicated to the illumination phase. This can be done, for instance, at the transmitter end, by scanning and sampling at a somewhat faster rate and by inserting idle time intervals between scans.

Alternatively, the operational speed of the FIG. 1 apparatus may be disassociated from the bandwidth of the transmission medium, capitalizing thereby on the high speed achievable in element 10 and in memory 20. Specifically, an auxiliary memory may be interposed between the received signals and element 10, or between element 10 and memory 20, and the received signals may be stored therein at the relatively low rate of the transmission medium. When the information of a full scan has been received, the auxiliary memory may be read-out at a high rate into memory 20, reducing thereby the time spent by memory 20 in the loading phase and correspondingly increasing the time spent in the illumination phase.

With a still different approach, an auxiliary memory may be employed which has a plurality of output ports. The output ports of the auxiliary memory and of memory 20 may be combined to permit multiplexed operation, and when operating in this manner, array 30 may be illuminated constantly. The constant illumination of array 30 permits a most conservative utilization of the LEDs in array 30, increasing reliability, and eliminating the necessity for an enabling pulse on line 41, thus permitting diodes $30_i$ to be permanently enabled by grounding line 41.

Figure 6:
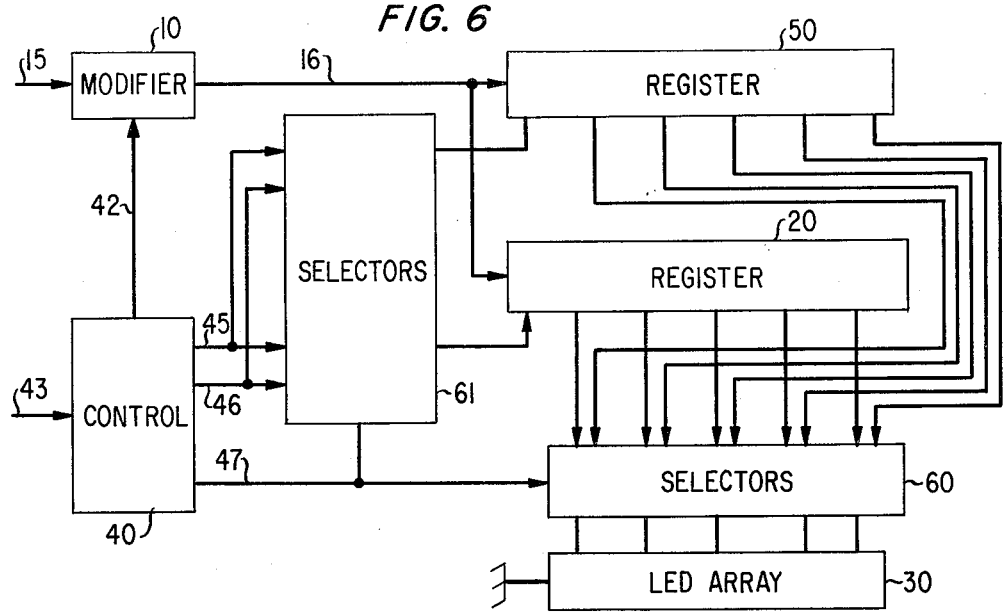
FIG. 6 illustrates an alternate block diagram for a facsimile receiver embodying the principles of this invention.

FIG. 6 depicts a schematic block diagram of the apparatus of FIG. 1 with an auxiliary memory 50 combined in parallel, or multiplexed, with memory 20. Memory 50, like memory 20, is responsive to data signals on lead 16. The output signals of memories 50 and 20 are applied to a data selector block 60, and the output signals of block 60 are connected to LED array 30. Block 60 comprises one-out-of-two selector elements, e.g., TI SN5450 integrated circuits, responsive to a control signal on lead 47. Under control of lead 47 signal, the output signals of either memory 50 or memory 20 are applied to array 30.

Control element 40 develops control signals on bus 42 as described previously, data-load clock signals on lead 45, data-display clock signals on lead 46, and a memory select signal on lead 47. The data-load and the data-display clock signals are selected in block 61 under control of lead 47 and are applied to memories 20 and 50. Block 61, like block 60, comprises one-out-of-two selector elements. Block 61 is interconnected so that the data-display clock signals drive the memory selected by block 60.

CONTROL ELEMENT 40

Figure 7:
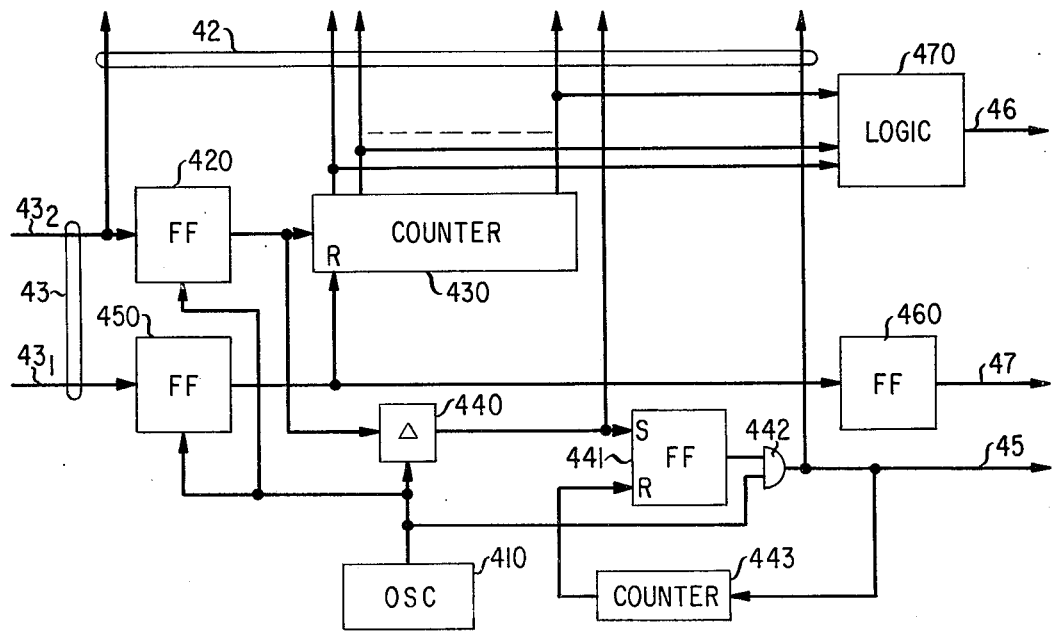
FIG. 7 depicts the schematic diagram of control element 40 in the receiver of FIG. 6.

FIG. 7 illustrates the schematic diagram of control element 40 suitable for the FIG. 6 receiver. Bus 43 is the control input bus and it comprises lines $43_1$ and $43_2$. Line $43_1$ delivers a pulse whenever a new scan is initiated while line $43_2$ delivers a pulse whenever a new word is received and applied to lead 15. An oscillator 410 is employed in element 40 to synchronize the operations of the FIG. 6 facsimile receiver. The signals on line $43_2$ are synchronized to oscillator 410 in flip flop 420 and having been synchronized, are applied to binary counter 430 and to delay element 440. The parallel outputs of counter 430 and line $43_2$ are included in bus 42. Line $43_2$ is used in modifier 10 to strobe the applied data signals into register 17, and the parallel outputs of counter 430 are used to address ROM 11. To account for the time consumed in modifier 10 in the correction of data, delay element 440 is adapted to delay the synchronized pulses of flip flop 420 by an amount of time commensurate with the time consumed in element 10. The output signal of element 440 sets flip-flop 441 and thereby initials a burst of $k$ clock pulses from oscillator 410, where $k$ is the number of bits per words applied from modifier 10 to memory 20. The burst of clock pulses is derived from gate 442 which is responsive to flip-flop 441 and to oscillator 410. The output signal of gate 442 is the data-load clock signal of line 45 which is employed to load memory 20. The output signal of element 440 and the data-load signal are also included in bus 42 and are employed in modifier 10 to strobe the truncated product into register 18 and to shift the strobed information out of register 18 and into memory 20. Flip-flop 441 is reset by a divide-by-$k$ counter 443 which is responsive to the clock pulses of gate 442.

The new-scan indication pulse of line $43_1$ is synchronized to oscillator 410 in flip-flop 450 and is applied to counter 430 to reset the counter. The output signal of flip-flop 450 is also applied to toggle flip-flop 460. The output signal of toggle flip-flop 460 changes state once every scan and is used as the memory select signal of lead 47.

Combinatorial network 470, responsive to counter 430, develops the data-display clock signal of lead 46. When binary coded words are stored in memories 20 and 50, the desired sequence of pulses out of network 470 must be arranged with binary spacing as shown in FIG. 3, with the basic spacing being a function of the number of bits in the words stored in memories 20 and 50, and a function of the total number of pels in a scan. The functional interrelationship can be seen from the following. For seven bit words, seven intervals are required. Each interval must be twice the duration of the previous interval. If the basic (and shortest) interval is one pel clock period long, a total of 127 pel clock periods are required to obtain the seven intervals (1 + 2 + 4 ... + 64). When the number of pels in a scan, K, is equal to a multiple of 127 (i.e., $K = 127M$ where M is an integer) then the first and shortest interval may conveniently be set to M pel clock periods. When so chosen, the seven desired intervals, may be obtained by detecting states M, 3M, 7M, 15M, 31M and 63M in counter 430. The state detections are performed in logic network 470 with conventional gate arrangements.

Many other memory organizations are possible which interchange speed, maximum illumination time and memory size. To minimize the size of memory 20, for example, the system of FIG. 1 may be constructed with memory 20 having only one bit of storage for each output port, keeping the remaining information of each scan in a random access auxiliary memory (RAM) placed before memory 20. Interestingly, in applications employing the one-bit-per-port memory 20 in conjunction with the binary coded enabling method, when all of the lower bits of the words stored in the auxiliary memory have been illuminated, and when the MSBs are extracted from the auxiliary memory and are stored in memory 20, the auxiliary memory may be relieved to store the information of a new scan. Of course, operating in this manner is possible only when the transmission of the scan data occupies only one-half the time interval between scans. In such situations, this method allows for the illumination of LEDs during almost the full time interval between scans. When the transmission of data occupies more than half the scan time, a still additional RAM may be placed in parallel with the first RAM and the two memories may be multiplexed in a manner quite similar to the multiplexing of memories 20 and 50 in the FIG. 6 system.

A fair portion of this disclosure has been devoted to the linear array, and with a good reason; to wit, the stringent requirements imposed on LED output integrity when linear arrays are used. Clearly, however, two dimensional and even three dimensional displays can with great ease be employed in the manner disclosed herein and may, in fact, tolerate the deletion of modifier 10. A two dimensional array can be constructed, for example, with a plurality of LEDs being multiplexed onto a single port of the multiport memory (or onto selector 60, if the FIG. 6 system is employed). Such multiplexing can easily be achieved through control of the enabling line 41.

The simultaneous illumination of the LEDs in array 30 and the consequent long time available for illuminating the LEDs is the kernel which realizes the tremendous advantages of systems embodying the principles of this invention.

The advantages inherent in the principles of this invention may be appreciated from the following example of a flat low voltage TV screen system employing a two dimensional LED array coupled to the FIG. 6 apparatus. For purposes of this example, it is assumed that 128 gray levels are sufficient for the TV system, that there are 525 rows of 456 pels in each row, and that the illumination time necessary to obtain a sufficient amount of light from each LED is 30 $\mu$sec.

Since the field rate of a TV raster (U.S.) is 60 Hz, each row must be refreshed every 16,667 msec. Since the necessary illumination time for an LED is 30 $\mu$sec, a complete row may be illuminated in 30 $\mu$sec and the whole field may be illuminated in 30 $\times$ 525, or 15.7 msec. Clearly, there is sufficient time to refresh the raster and, therefore, a TV system may be constructed with a single memory arrangement as shown in FIG. 6. The memories employed (20 and 50) must comprise merely 456 words having 7 bits each, with each of the 456 output ports being connected to the 456 LEDs of each row in the LED array. Additionally, each row of LEDs within the array is connected to an enable line not unlike enable line 41 of FIG. 1. The 525 enable lines obtain their control signals from control element 40. These control signals may be generated with a 525 bit shift register into which a pulse is inserted when a new scan starts and to which a clock is connected for shifting the inserted pulse at a 30 $\mu$sec rate. Thus arranged, a complete TV screen display is realized merely with an LED array, a memory 50, a memory 20, a selector 60, 525 bit shift register and a small amount of control circuitry.

What is claimed is:

1. A facsimile system comprising:
    an array of pel energy sources, each having a first lead and a second lead;
    a memory having a first plurality of parallel outputs;
    first means for connecting said first leads of said energy sources to said first plurality of parallel outputs;
    second means for connecting said second leads of said energy sources to a third plurality of terminals; and
    third means for simultaneously activating the pel energy sources of said array which are connected to each terminal of said third plurality of terminals.

2. The system of claim 1 wherein said memory is a multiport shift register.

3. The system of claim 1 wherein said memory comprises a plurality of interconnected shift registers.

4. The system of claim 1 wherein said first plurality of parallel outputs is a submultiple of the number of energy sources in said array.

5. The system of claim 4 wherein said first means includes fourth means for connecting an equal number of said first leads of said energy sources to each of said first plurality of parallel outputs.

6. The system of claim 5 where said second terminals of those energy sources connected to a particular parallel output of said first plurality of parallel outputs are each connected to a different terminal of said third plurality of terminals.

7. The apparatus of claim 1 wherein said array is arranged as a two-dimensional array having L lines and K rows, where L and K are preselected constants.

8. The system of claim 1 wherein said third means includes means for applying control signals to enable said pel energy sources connected to said third plurality of terminals.

9. The system of claim 8 wherein said control signals are coupled to said memory.

10. The system of claim 8 wherein said control signals are applied to said memory and to said third plurality of terminals.

11. The system of claim 8 wherein said control signals are binary.

12. The system of claim 11 wherein said control signals comprise a train of pulse groups, each group having a preselected number of controlled duration pulses in each of said pulse groups.

13. The system of claim 12 wherein said pulses in each of said groups are related to each other in accordance with a preselected weighting factor.

14. The system of claim 12 wherein each pulse in said pulse group is twice as long in its duration as its preceding pulse.

15. The system of claim 12 wherein each pulse in said pulse group is half as long in duration as its preceding pulse.

16. The apparatus of claim 1 wherein said energy sources are light sources.

17. The apparatus of claim 1 wherein said energy sources are light emitting diodes.

18. The system of claim 1 further comprising:
fifth means for loading said memory with data representative of a pictorial field sought to be displayed.

19. The apparatus of claim 18 further comprising an auxiliary memory interposed between said fifth means and said memory.

20. The apparatus of claim 18, further comprising:
an auxiliary memory responsive to said fifth means, said auxiliary memory possessing a fourth plurality of parallel outputs; and
sixth means for multiplexing said fourth plurality of parallel outputs with said first plurality of parallel outputs.

21. The apparatus of claim 20 wherein said fourth plurality of parallel outputs equals said first plurality of parallel outputs.

22. A multitone display apparatus comprising:
an array of pel energy sources;
means for applying simultaneously data signals to said energy sources; and
means for simultaneously applying period controlled signals to said array to effect multitone operation of said energy sources.

23. A display apparatus comprising:
a plurality of pel energy sources responsive to applied data signals;
first means for simultaneously activating said plurality of energy sources; and
second means for applying activation signals to said first means, which activation signals are period controlled in accordance with the coding format of said data signals.

24. A method for generating multitone displays in an array of energy sources comprising:
applying multitone data signals to said energy sources; and
simultaneously activating said energy sources for each bit of said data signals in accordance with the coding format of said data signals.

25. The method of displaying gray-scale pictorial data comprising the steps of:
(1) storing coded representations of a plurality of gray scale values,
(2) simultaneously applying said stored coded representations to more than one of a plurality of display elements, and
(3) simultaneously enabling those display elements to which coded representations are applied by step 2, thereby energizing those display elements for a duration proportional to the corresponding gray scale value.

* * * * *